3,129,919
VALVED QUICK COUPLER
Jack M. Evans, Englewood, Colo., assignor to Band-It Company, Denver, Colo., a corporation of Delaware
Filed Sept. 8, 1961, Ser. No. 136,845
5 Claims. (Cl. 251—89.5)

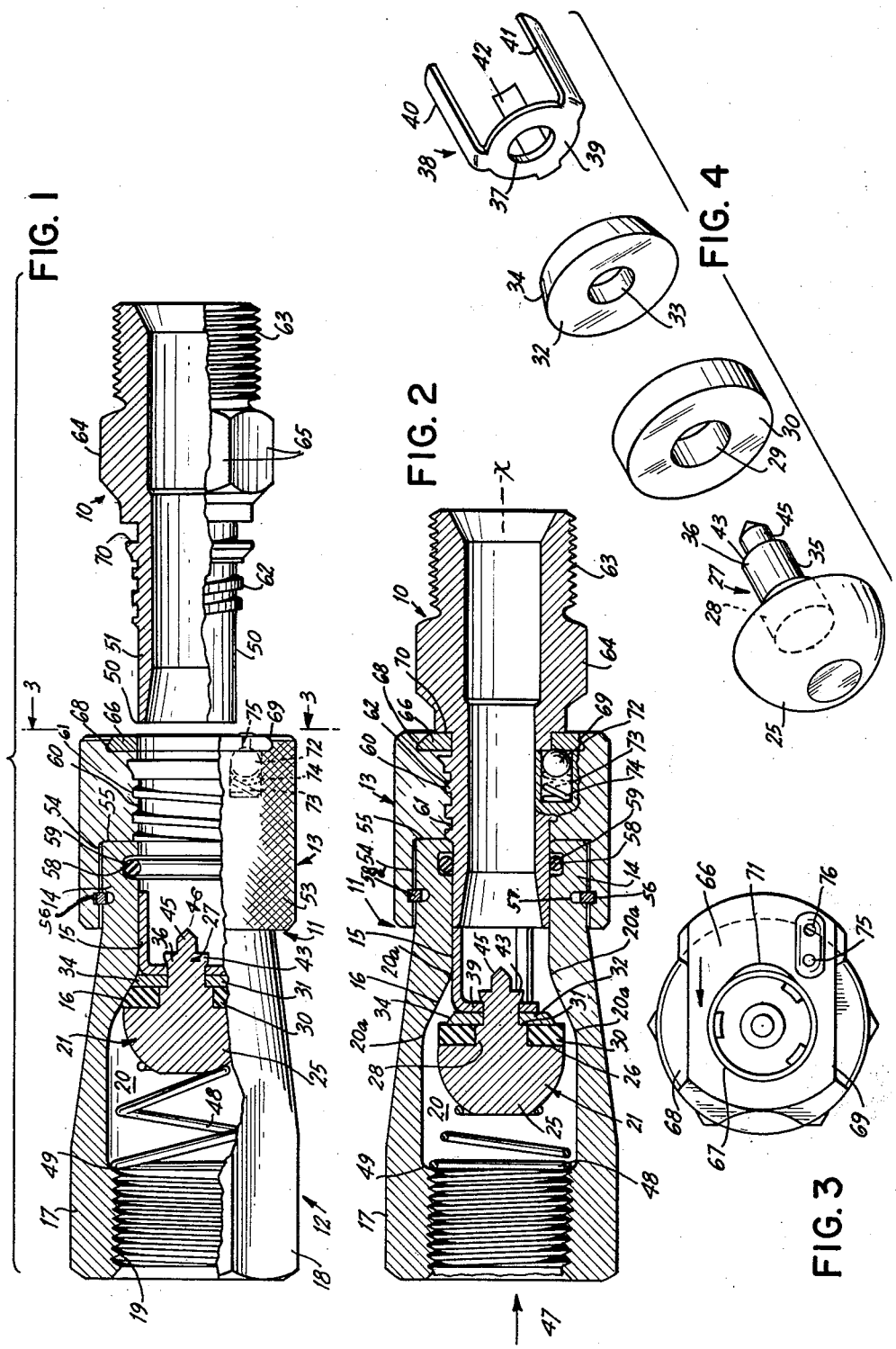

This invention relates to coupling devices and more particularly to valved couplers for quickly coupling and uncoupling conduits. Still more particularly the invention relates to coupling devices of the type in which a male part is secured to one end of a length of conduit, which may be a flexible hose or it may be a rigid conduit, and in which a female part is secured to an end of another length of conduit, which may be another length of flexible hose, or it may be a rigid conduit, and in which the male and female parts may be quickly coupled and uncoupled.

More particularly the invention relates to a quick coupler in which one of the separable parts has a valve which is closed when the coupler is uncoupled and opened when the two parts are coupled.

In the valved type of quick coupler, i.e., one in which a valve is closed when the coupler is uncoupled and opened when the coupler is coupled, it has been common practice to use a flat valve surface or a tapered valve surface or combinations of these wherein the mating surface comes in contact with some type of packing of a more or less resilient nature, such as a washer or gasket, or an O ring or a special cross-section type of sealing ring. When such sealing washers or gaskets of a resilient nature are used, they must be confined in grooves, behind shoulders, under ledges, or in some way held so that they can contact the valve seating surface without being dislodged. Such construction provides shoulders, corners, breaks in contours of the flow area and creates other turbulence-causing factors.

Also in those couplers the resilient sealing parts are at times dislodged from their nesting places under extreme changes of flow conditions, sudden acceleration or deceleration of the flow; especially when the valve mechanism is quickly actuated. This will create obstructions to flow and also will destroy the sealing action when the valve is actuated to closed position.

In accordance with this invention a valved quick coupler is provided in which the internal surface of the flow cavity presents a smooth, unbroken flow area and a valve of spheroidal shape is provided which cooperates with the internal surface of the flow cavity in a manner which eliminates turbulence and provides greater flow capacity than a valve that has flat or plate-like surfaces. Moreover, the spheroidal valve itself is provided with a ring or gasket of resilient material and the valve is so contrived as to include a metal ring valve stop which provides metal to metal contact with the wall of the valve cavity downstream from the resilient gasket in addition to contact of the resilient ring gasket with the wall of the valve cavity when the valve is closed. Furthermore, the spheroidal valve is provided with a plurality of spaced actuating legs which prevent any wobbling action tending to interfere with a proper actuation or seating of the valve.

Although the novel features which are believed to be characteristic of the invention are pointed out in the annexed claims, the invention itself as to its objects and advantages and the manner in which it may be carried out may be better understood by reference to the following description of a preferred embodiment taken in connection with the accompanying drawings forming a part hereof, in which:

FIG. 1 is a view in elevation and partly in section showing the coupler in uncoupled relation;

FIG. 2 is a view in elevation and in section showing the coupler in coupled relation;

FIG. 3 is a view on line 3—3 of FIG. 1; and

FIG. 4 is an exploded view of the spheroidal valve showing its separate parts prior to assembly.

Referring now to the drawings, in which like reference characters indicate like parts throughout the several views, the coupler comprises a male part 10 and a female part 11. The female part 11 comprises a valve body 12 and a rotatable sleeve 13 into which the male part 10 is insertable for coupling the male and female parts. The outer end of the male part 10 may have means such as an externally threaded end, as shown, for connection to a female fitting, or it may have an internally threaded end for connection to a male fitting. The female part 11 may have an internally threaded end, as shown, for connection to a male fitting, or it may have an externally threaded end for connection to a female fitting.

The valve body 12 is of generally hollow cylindrical shape and made of metal, such as brass, or of other suitable metal. It has a female hollow neck portion 14 having a cylindrical bore 15. The bore of the valve body is tapered and flares outwardly from the end of cylindrical bore 15 to provide a tapered valve seat 16. The valve seat portion 16 has an inner surface of truncated cone shape, flaring outwardly toward the outer end portion 17 of the valve body 12 of the coupler. The outer portion 17 on its outside surface is shaped to accommodate a tool such as a wrench and, as shown, is hexagonal, having six flat sides 18. As shown, the outer hexagonal portion 17 has an internal longitudinal, threaded bore, having threads 19 to receive a male fitting having conventional male threads. The threaded fitting (not shown) is normally clamped or secured, in known manner, to the end of a length of flexible hose, or other conduit, which carries a fluid, such as liquid, air, or other gas, under pressure. Or, the valve housing 17 of the female part 11 may be secured in any known manner to some other suitable fitting on a conduit which carries fluid under pressure.

Mounted within the valve cavity 20, for reciprocatable movement longitudinally therein, is a spheroidal valve, designated generally by reference numeral 21. This valve which for convenience of description is herein sometimes called a "ball" valve, is of generally spheroidal shape and is made up of a number of separate components. The separate components are perhaps best shown in FIG. 4. When assembled they form the spheroidally shaped ball valve 21, as shown in FIGS. 1 and 2.

The ball valve 21 comprises a spheroidally shaped crown portion 25 which is cut away around its periphery to form a flat annular shoulder 26. Extending outwardly and axially from the center of the flat annular shoulder 26 is a boss 27; this boss 27 having a gasket retaining portion 28 which has a diameter to correspond to the diameter of a central opening 29 in a gasket 30 which is of resilient material, such as buna, neoprene, or other suitable gasket material of a resilient nature. The gasket retaining portion 28 is reduced in diameter at its outer end to provide an annular shoulder 31 upon which may rest a metal retainer ring 32. The retainer ring 32 is made of brass, or other suitable rigid material. It may, for convenience of description be called a rigid ring "valve stop." As shown, it is a flat brass ring having a central opening 33 and a peripheral edge 34 which is tapered or bevelled. The peripheral bevelled edge 34 of the retianer ring 32 has a diameter and a sloped shape to conform with the tapered valve seat 16 of the valve cavity 20 so that when the ball valve 21 is in closed position, as shown in FIG. 1, there is metal to metal contact between the valve stop ring 32 and its seat 16 in the valve housing; this metal to metal contact being below the gasket sealing area; i.e., downstream from the gasket sealing area. Also it is significant to note that the inner surface of the valve housing cavity 20 is free from sharp edges or corners; the junctures of the cylindrical parts in the tapered part being rounded or curved to eliminate sharp ledges or corners, as shown at 20a.

The boss 27 is further reduced in diameter outwardly from the annular shoulder 31 to correspond to the diameter of the central opening 33 in metal retainer ring or valve stop 32. This portion 35 of the boss extends beyond the thickness of retainer ring 32 and provides a cylindrical stake portion 36 which extends through a central opening 37 of metal cage or spider member 38. The spider member 38 has a flat ring portion 39. Extending outwardly in an axial direction from the outer periphery of the ring 39 are a plurality of prongs or legs 40, 41, 42 which are circumferentially spaced apart equal angular distances. The stake portion 36 of the boss 27 extends through the central opening 37 of the spider ring. After the parts of the valve shown in FIG. 4 are assembled as shown in FIG. 1, the shoulder 43 of stake 36 is upset and flared outwardly so that its periphery is expanded and the expanded shoulder edge 43 clamps and retains the spider ring 39, gasket retainer or stop ring 32, and resilient gasket 30, in assembled relation, on the main or crown portion 25 of the ball valve 21, as shown in FIGS. 1 and 2. The legs 40, 41, 42 on the flat ring 39 lie in a circle and fit in the hollow neck 15 and provide guide means on said valve to prevent any wobbling or cocking when the valve is moved to open or to closed positions.

Extending outwardly and axially from the stake portion 36 is a projection 45 having a conical pointed end portion 46. This pointed conical tip 45 provides a guide for the fluid flowing around the valve so that it bleeds off the flow without turbulence in a manner similar to the trailing edge of an airplane wing which breaks a drag behind the wing. It will be understood that fluid flows through the coupling in the direction indicated by arrow 47.

A tapered helical spring 48, having one end restting on a shoulder 49 in the valve housing and the other end in engagement with the crown 25 of the ball valve, exerts a force tending to move the valve toward its seat 16.

The axially disposed legs 40, 41, 42 of the guide spider 38 are such that they fit snugly but slidably in the bore of the neck portion 14 of the female part 11 of the coupler. The length of these legs is such that their outer ends are engaged by the end 50 of hollow stem portion 51 and push the ball valve 21 to open position when the male and female parts of the coupler are coupled together, as shown in FIG. 2.

Rotatably mounted on the neck portion 14 is a metal collar or sleeve 13, which as shown is of steel, although it may be made of any other suitable material. It has a knurled surface 53. The sleeve 13 has a bore 54 of a diameter to rotatably fit over the exterior cylindrical surface of the neck 14; the bore being reduced in diameter at the end of the neck to provide an annular stop shoulder 55 which engages the end of the neck. A groove 56 in the internal surface of bore 54 registers with a complementary groove 57 in the exterior surface of the neck 14. A split retaining ring 58a of steel is mounted in the grooves and this retaining ring secures the collar sleeve 13 on to the neck 14 but permits rotation of the sleeve on the neck.

There is a groove 58 in the interior surface of the hollow neck within which is mounted an O ring of buna, neoprene, or other suitable wear-resisting, resilient material, which provides a seal resulting in leak-proof and pressure-proof contact between the interior surface of the neck and the exterior surface of the hollow stem portion 51 of the male part 10 when the coupler is coupled as shown in FIG. 2. It should be noted that the sealing ring 59 is positioned beyond the ends of the legs 40, 41, 42, when the valve is closed, as shown in FIG. 1, so that when the stem 51 is inserted into the sleeve 13 to couple the coupler from uncoupled position, the stem is actually sealed by the O ring before the valve 21 begins to open.

The reduced bore 60 of the sleeve 13 is internally threaded with a coarse thread 61 and the stem 51 of the male part 10 is externally threaded with a complementary coarse thread 62. Hence, when the stem 51 is inserted in the sleeve 13, the stem is screwed quickly through the sleeve by a relatively few turns of the sleeve or stem.

This arrangement, as shown, has the advantage that the operator can insert the male stem portion 51 into the female part and complete the connection against pressure against the valve in the female part and there will be no leakage of fluid or gas "blow-by" as the valve is being actuated and thus the operator is spared the trouble of overcoming the initial pressure surge. In most prior art couplers the operator must fight the initial pressure surge when making mechanical engagement of the uncoupled parts and there is leakage until the parts are completely locked whereas in the device of this invention that drawback is eliminated. Also in uncoupling the male and female parts 10 and 11 the valve 21 is completely seated before the hollow stem 51 passes out of contact with the sealing ring 59 and prior to the time the coarse threads 62 of stem 51 are disengaged from their corresponding female coarse threads 61. This eliminates leakage when the coupler is uncoupled even though there is pressure in the conduit on the upstream side of the female part 11 of the coupler.

The outer end of the male part 10 is provided with a hollow externally threaded portion 63 to provide means for connecting the male part of the coupler to a conventional fitting (not shown) which is secured in known manner to the end of a length of flexible conduit, such as a hose. However, it will be understood that the end of the male part 10 may have a female thread and also that the end of the male part may be connected to a conduit which is not a flexible hose but a rigid and fixed or portable conduit. Between the coarse thread 62 and the pipe thread 63 of the male part 10 is a wrench receiving ring 64 of larger diameter. As shown, the wrench receiving ring 64 is hexagonally shaped and has six faces 65. The male part, as shown, is steel, but any suitable material may be used.

The coupler has means for locking the male and female parts together when they are coupled. The locking means comprise a locking plate 66 which is mounted in a guideway for slidable movement in a plane at right angles to the axis X of the coupler. The lock plate 66 has an aperture 67—slightly larger than the external diameter of the stem 51. The plate 66 is slidable crosswise of the sleeve to place the center of aperture 67 in axial alignment with the axis X of the stem. In this position the stem is slidable through the opening 67 into the sleeve 13. After the stem is screwed home to "opened valve" position as shown in FIG. 2, the plate may then be moved in its guideways 68, 69 to locked position in which the periphery of the aperture 67 moves into a locking groove 70 in the stem of the male part.

It will be noted that the aperture 67 has a cut-out portion 71 of a shorter radius, so that this part will definitely engage the groove 70 when the lock plate is moved to "locked" position. In FIG. 3 the plate is shown "unlocked" or in open position and it will be noted that it is temporarily maintained in that position by means of a ball 72 resiliently held in a bore 73 in the sleeve, by a spring 74 which urges the ball outwardly into a detent 75 in the plate 66. When the locking plate 66 is moved to closed, or "locked" position, that is toward the left in FIG. 3, the ball 72 is depressed and the plate may be moved so that the ball enters detent 76 in the plate to hold the plate in locked position with the peripheral edge 71 of the aperture 67 engaged in the locking groove 70 of the male part of the coupler. This will maintain the coupler in locked position until the plate is manually moved to unlock the coupler.

It will be seen from the foregoing description that when the male part 10 is uncoupled and separated from the female part, as shown in FIG. 1, the valve 21 closes on its seat 16. The spring 48 urges the ball valve 21 to closed position. If there is pressure in the line to which the female part is connected, this pressure will press upon the valve to more tightly close the valve. At first, the resilient sealing gasket 16 will engage the tapered metal surface of the valve cavity housing and seal the opening, then as the pressure builds up even though almost instantaneously, the bevelled metal edge 34 of metal stop 32 will engage the metal seat 16 and will provide a metal to metal stop and thus relieve the resilient sealing gasket of undue punishment. At zero gauge pressure in cavity 20, the spring 48 exerts sufficient force to close and provide a seal between the edge of the resilient gasket 30 and the tapered surface of the valve housing. And as additional pressure is applied to the ball valve, the resilient gasket seal is tightened and a metal to metal seal is also provided.

If it is desired to couple the line having the pressure, such as compressed air, in order to carry the compressed air to an extension length of conduit, this may be done as follows: the male part of the coupler which is secured to the extension length is inserted through the lock plate 66, in unlocked position (as shown in FIG. 3). The sleeve 13 is rotated to screw the stem 51 into the female part. The end 50 of the stem engages the ends of legs 40, 41, 42 of spider cage 38 and the spider cage then moves the ball valve 21 toward open position. When the stem 51 is screwed home (as shown in FIG. 2), the stop plate 32 and the resilient gasket 30 are moved off their seat 16 and the valve is opened. The plate 66 is then moved to locked position so that the periphery of aperture 67 engages in the groove 70 to maintain the coupler coupled in locked position with the valve wide open.

It has been found that the fluid under pressure then flows through the annular space between the tapered surface 16 and the spheroidal surface of the valve 21, evenly and without turbulence; the pointed conical projection 45 serving to guide the air flow without turbulence. The result is a greater flow of air for the same size coupling than couplers having flat valve surfaces or projecting ledges or edges in the path of flow of the pressure fluid.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A valve mechanism in a quickly coupled and uncoupled coupler of the class described which comprises a hollow female part and a hollow male part; said female part comprising means to secure it to a length of conduit, a hollow valve housing portion, an axially aligned hollow neck portion and a rotatable sleeve rotatably mounted on said neck portion, the internal surface of said valve housing portion being flared outwardly from the end of said neck portion to provide an annular tapered valve seat, and said male part comprising means to secure it to a length of conduit and a hollow stem portion having a forward end insertable into said sleeve and said neck portion of said female part, said male and female parts being coupled when said hollow stem is moved forward in said hollow neck to coupled position; said valve mechanism comprising, a ball valve in said valve housing movable in a direction away from said valve seat to open position and toward said seat into engagement therewith to closed position, resilient spring means in said valve housing urging said valve toward said valve seat, said valve having guide means and having an annular resilient gasket and a stop ring of rigid material engaging said gasket; said valve having a spheroidal crown portion engaged by said spring means, said resilient gasket lying between said crown portion and stop ring, said guide means including a flat ring portion and a plurality of circumferentially spaced, coaxially disposed guide legs, said guide legs extending into and being slidable with a snug fit in the neck portion of said female part and being engageable by said hollow stem of said male part, said flat ring portion of said guide means being fixed to said ball valve and maintaining said resilient gasket and said stop ring in fixed position on said valve, the peripheral edge of said stop ring being tapered at the same angle as the angle of flare of said annular valve seat, the peripheral edge of said resilient gasket and the tapered peripheral edge of said stop ring engaging said flared valve seat when said valve is in closed position, said valve being moved to open position when said hollow stem is inserted into said neck portion of said female part into engagement with said guide legs and said male and female parts are in coupled position, said hollow stem maintaining said valve in open position when said male and female parts are in coupled position and said valve being moved to closed position by said spring when the forward end of said hollow stem is retracted to a position out of engagement with said guide legs and said coupler is uncoupled.

2. A valve mechanism in a quickly coupled and uncoupled coupler of the class described which comprises a hollow metal female part, a hollow metal part and lock means movable to locked position to maintain said parts locked together in locked coupled position and movable to unlocked position whereby to separate said parts to uncoupled position; said female part comprising means to secure it to a length of conduit, a hollow valve housing portion and an axially aligned hollow neck portion and a rotatable metal sleeve rotatably mounted on said neck portion, the internal surface of said valve housing portion being flared outwardly from the end of said neck portion to provide an annular tapered valve seat and the interior of said housing being free from sharp ledges and corners, and said male part comprising means to secure it to a length of conduit and a hollow stem portion having a forward end insertable into said sleeve and said neck portion of said female part, said valve mechanism comprising, a ball valve in said valve housing movable to open position and to closed position, said valve having a metal crown portion of spheroidal shape, resilient spring means in said valve housing engaging said crown portion and urging said valve toward said valve seat, an axial metal boss extending from said crown portion, a flat ring gasket of resilient material mounted on said boss and a stop ring of metal mounted on said boss engaging said gasket; said top ring maintaining said resilient gasket ring in fixed position on said crown portion between said stop ring and crown portion, a spider member including a flat ring portion mounted on said boss and staked thereon and maintaining said stop ring on said boss and including a plurality of circumferentially spaced, coaxially disposed guide legs integral with the flat ring portion of said spider member, said guide legs of said spider member extending into and being slidable with a snug fit in the neck portion of said female part, said legs being engageable by the end of said hollow stem of said male part when said stem is inserted into the neck portion of said female part and moved to coupled position, the peripheral edge of said metal stop ring being tapered at the same angle as the angle of flare of said annular valve seat, the peripheral edge of said resilient gasket and the tapered peripheral edge of said stop ring engaging said flared valve seat when said valve is in closed position thereby providing metal to metal contact and resilient gasket to metal contact between the valve and its seat to insure a seal against fluid leakage through said valve housing when said valve is in closed position, said valve being moved to closed position by said spring when the forward end of said hollow stem is retracted to a position out of engagement with said guide legs and said coupler is uncoupled and said valve being moved to open position when said hollow stem is inserted into said neck portion of said female into engagement with said guide legs and said coupler is coupled, said hollow stem maintaining said valve in open position when said coupler is coupled and locked in coupled position.

3. A valve mechanism constructed according to claim 2 in which there are three circumferentially spaced guide legs extending from the ring portion of said spider member spaced 120° apart.

4. A valve mechanism constructed according to claim 2 in which said boss has a conically shaped end portion extending in an axial direction beyond the flat ring portion of said spider member.

5. A structure as defined in claim 2 in which said neck portion connected to said valve housing has a groove on its interior surface and an O ring mounted in said groove engageable with the exterior surface of said hollow stem portion which produces a seal when said stem portion is inserted in said neck portion.

References Cited in the file of this patent

UNITED STATES PATENTS

| | | |
|---|---|---|
| 2,451,441 | Main | Oct. 12, 1948 |
| 2,777,716 | Gray | Jan. 15, 1957 |
| 2,828,978 | Wurzburger | Apr. 1, 1958 |
| 2,968,497 | Treleman | Jan. 17, 1961 |

FOREIGN PATENTS

| | | |
|---|---|---|
| 602,715 | Canada | Aug. 2, 1960 |